United States Patent [19]

Junker

[11] 4,299,062
[45] Nov. 10, 1981

[54] DEVICE FOR THE PRODUCTION OF GEAR WHEELS

[76] Inventor: Erwin Junker, 78 Talstrasse, 7611 Nordrach-Baden, Fed. Rep. of Germany

[21] Appl. No.: 965,706

[22] Filed: Nov. 30, 1978

[30] Foreign Application Priority Data

Nov. 30, 1977 [DE] Fed. Rep. of Germany ....... 2753469

[51] Int. Cl.³ .......................... B23F 1/02; B23F 21/02
[52] U.S. Cl. ..................................... 51/206 P; 51/287
[58] Field of Search ................... 51/52 R, 52 HB, 287, 51/206 P, 956

[56] References Cited

U.S. PATENT DOCUMENTS

| | | | |
|---|---|---|---|
| 2,672,713 | 3/1954 | Brady | 51/52 HB |
| 3,368,263 | 2/1968 | Harris | 51/287 X |
| 3,974,595 | 8/1976 | Wolf | 51/52 R |

FOREIGN PATENT DOCUMENTS

| | | | |
|---|---|---|---|
| 1527113 | 6/1969 | Fed. Rep. of Germany | 51/287 |
| 313210 | 3/1956 | Switzerland | 51/287 |

*Primary Examiner*—Gary L. Smith
*Attorney, Agent, or Firm*—Wenderoth, Lind & Ponack

[57] ABSTRACT

A grinding disk for forming a spur gear includes a single integral disk member having a grinding surface including a finish grinding tooth and a pre-grinding tooth. The finish grinding tooth has a profile corresponding to the desired configuration of the flanks of adjacent teeth and the tooth gap therebetween for a given spur gear to be formed. The pre-grinding tooth has a profile formed by curved surfaces only. The finish grinding tooth and the pre-grinding tooth are spaced by distance equal to one tooth pitch between adjacent teeth of the spur gear to be formed.

2 Claims, 2 Drawing Figures

DEVICE FOR THE PRODUCTION OF GEAR WHEELS

BACKGROUND OF THE INVENTION

The invention relates to a process and apparatus for the high-speed grinding of gear wheels.

Heretofore, gear wheels have been produced by means of metal cutting, such as for example milling, planing and punching, or also by means of non-cutting, for example, by casting. This type of production is almost exclusively effected on hobbing machines.

In Swiss Pat. No. 312,330, the grinding of external gear wheels is described whereby several grinding disk groups are distributed on the circumference of the gear wheel. With this arrangement, the profile is subjected to finish grinding only because a rough-machined blank is used in each instance.

With the proposal according to German Publication No. 15 27 113, only one tooth is subjected to finish grinding before the next tooth is machined. In this process, a great risk is run that the already finished tooth is bent or even breaks off while the next tooth is produced due to the pressure involved.

SUMMARY OF THE INVENTION

The object of the invention is to provide a process and apparatus with which gear wheels can be produced more accurately, faster and more economically than has been possible to date.

This object is accomplished in accordance with the invention in such a way that a pre-grinding process of one tooth profile is effected simultaneously with the finish grinding of an adjacent tooth profile. Due to the pre-grinding, a volume is removed from the circumference of the blank so that the finish grinding of the pre-ground tooth profile can be effected in a very careful manner and without high pressure after the blank has been turned or indexed by one tooth pitch. The pre-grinding and finish grinding operations are effected by a single, accordingly-shaped grinding disk while the blank is intermittently turned or indexed.

After each turn of the gear wheel blank, always by one tooth pitch, the grinding disk grinds to finished size the right and left flanks of adjacent teeth as well as the base between these teeth as the disk moves parallel to the center axis of the blank while, at the same time, the flank profile of an adjacent tooth located one pitch away in opposition to the direction of rotation of the gear wheel is preground. Thus, the profile of the portion of the tooth serving as an initial or reference point is subjected to finish grinding after rotation on the gear wheel by 360°. In an expedient manner, one tooth is finish ground with each movement of the grinding disk. The operation can also be effected in such a way that the volume ground out of the blank during pregrinding amounts to about 90% of the total volume to be ground off.

The grinding disk to perform the process according to the invention advantageously has a finish grinding tooth which has a profile corresponding exactly with the profile of the tooth flank and tooth base to be produced, and a pregrinding tooth which has a profile which essentially deviates from that of the finish grinding tooth and is arranged at a distance from the finish grinding tooth by one pitch of the gear wheel to be produced.

The essential advantage of the invention is that high-strength and heat-treated or already hardened materials can be machined without previously being milled. Therefore, the hardness and strength of the work piece to be machined plays a subordinate role. Another advantage is the more precise mode of operation which is made possible because only shaft pressure is applied. The gear wheels can also be produced faster because no scraping or any other additional machining is required, and thus, a directly finished, toothed gear wheel is produced.

In accordance with the process of the invention, gearteeth and a tooth gap or recess between the teeth are finish ground by a single grinding disk while, at the same time, an adjacent tooth gap or recess is preground to a large extent, i.e., up to 90% of the volume is removed by the pregrinding process. This results in an extremely favorable pressure distribution in that no essential pressure is exerted on the tooth flank of the finish ground tooth by the grinding disk. This also excludes the possibility that the tooth being finished is bent or is permanently deformed, both matters representing disadvantages which are considerable for gear wheels with external toothing. Additionally, the risk of the tooth being finished breaking off is avoided. Also, the pitch circle of the gear wheel to be produced always remains a circle and does not deviate from this form. Therefore, no pitch circle inaccuracies are to be expected as, for example, in accordance with the proposal of Swiss Pat. No. 312,330.

The grinding disk used to perform the process according to the invention has a high service life and strength because the pregrinding tooth with which an essential portion of the volume is ground off, for example, approximately 90%, has curved surfaces of relatively large radii which do not break off as easily as sharp edges, and such surfaces are asymmetrical with respect to the finished tooth gap profile and a corresponding radius of the gear wheel.

BRIEF DESCRIPTION OF THE DRAWINGS

Additional advantages will be apparent from the following description of one example of the invention, with reference to the attached drawings wherein.

DETAILED DESCRIPTION OF THE INVENTION

Figure 1:
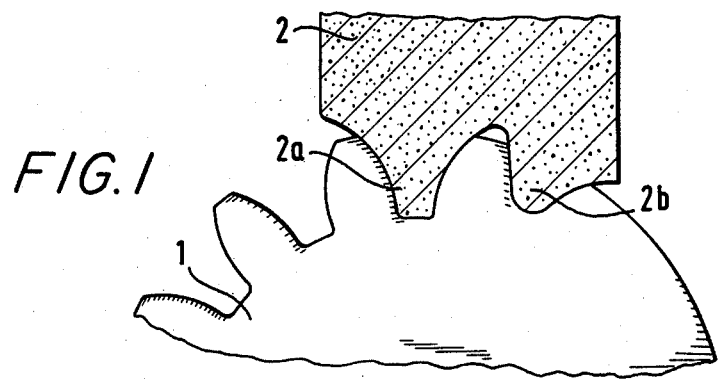
FIG. 1 is a schematic elevation view, in partial section, of a grinding disk according to the invention with a gear wheel.

In FIG. 1 there is shown a gear wheel 1 into which the individual teeth are to be ground. For this purpose, a grinding disk 2 can be moved against the gear wheel 1. Disk 2 has a finish grinding tooth 2a corresponding in its circumferential profile with the profile of the right and left flanks as well as the base circle of two adjacent teeth to be formed in the gear wheel.

Adjacent to finish grinding tooth 2a and at a specific distance therefrom is a pre-grinding tooth 2b which has no sharp corners but relatively large circumferential radii. In the illustrated example, approximately 90% of the material is ground out of the circumference of the gear wheel with pre-grinding tooth 2b before the finish grinding tooth 2a effects the finish grinding of the recess.

Figure 2:
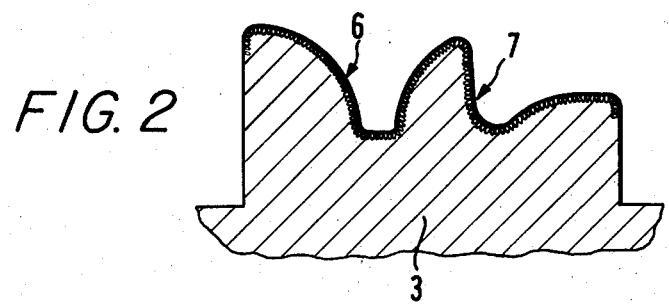
FIG. 2 is an elevation view of a sectioning roller for forming the disk of FIG. 1.

Furthermore, FIG. 2 shows a sectioning roller 3 which has a finish roller fin 6 and a pre-roller fin 7 extending circumferentially. The profile of the roller 3 is selected in such a manner that the grinding disk 2 can be sectioned or formed thereby, and consequently, disk 2 has a circumference which in section is complimentable to that of the roller 3, as this is shown in the drawings.

In the illustrated example, the sectioning roller 3 is provided with a diamond layer on its active machining surfaces by means of which the service life of the roller is increased.

In the case of another example design of the invention, the grinding disk is a borazon grinding disk which can be resectioned with a crusher roller.

At the beginning of the production process, the grinding disk 2 effects a pendulum grinding motion from the top to the bottom, i.e., parallel to the axis of gear wheel 1, whereby the finish grinding tooth 2a and the pre-grinding tooth 2b grind into the solid material of the gear wheel, but not quite to the finished size and depth of the teeth. Subsequently, each tooth is always ground sequentially, i.e., one tooth is finish ground during movement of the disk in a first direction, and an adjacent second tooth is preground, then the work piece or the grinding disk is moved circumferentially by one pitch and during a return parallel movement of the disk the second tooth is finish ground and an adjacent third tooth is pre-ground. These movements are alternately repeated until, finally, the last tooth has been subjected to finish grinding. However, this last tooth is always that tooth which is the first to be pre-ground at the beginning of the process.

I claim:

1. A shaped grinding disk for use in forming a spur gear from a smooth-surfaced cylindrical blank, said grinding disk comprising:

a single integral disk member having a grinding surface including a finish grinding tooth and a pre-grinding tooth;

said finish grinding tooth having a profile corresponding to the desired configuration of the flanks of adjacent teeth and to the tooth gap therebetween for a given spur gear to be formed;

said pre-grinding tooth having a profile formed by curved surfaces only; and said finish grinding tooth and said pre-grinding tooth being spaced by a distance equal to one tooth pitch between adjacent teeth of the spur gear to be formed.

2. A grinding disk as claimed in claim 1, wherein said curved surfaces of the profile of said pre-grinding tooth are asymmetrical with respect to each other and to the finished tooth gap between adjacent teeth of the spur gear to be formed.

* * * * *